(12) United States Patent
Keiser et al.

(10) Patent No.: US 6,893,707 B2
(45) Date of Patent: May 17, 2005

(54) STRUCTURED POLYOLEFIN COATED SUBSTRATES AND PROCESSES FOR MAKING THE SAME

(75) Inventors: LeRoy Herbert Keiser, Darien, IL (US); Kurt Henry Mather, Geneva, IL (US)

(73) Assignee: Loparex, Inc., Willowbrook, IL (US)

( * ) Notice: Subject to any disclaimer, the term of this patent is extended or adjusted under 35 U.S.C. 154(b) by 23 days.

(21) Appl. No.: 10/298,885

(22) Filed: Nov. 18, 2002

(65) Prior Publication Data

US 2003/0091791 A1 May 15, 2003

Related U.S. Application Data

(63) Continuation-in-part of application No. 09/547,549, filed on Apr. 12, 2000, now abandoned.

(51) Int. Cl.[7] .............................. B32B 3/30; B05D 3/12
(52) U.S. Cl. ..................... 428/141; 428/41.8; 428/219; 428/340; 428/156; 428/213; 428/215; 428/511; 428/220; 264/171.23; 264/284; 264/175; 427/278; 427/391; 427/398.2; 427/288; 427/361; 427/362; 427/365; 492/37
(58) Field of Search .................................. 428/141, 511, 428/220, 41.8, 219, 340, 156, 213, 215; 427/278, 391, 398.2, 288, 361, 362, 365; 492/37; 264/171.23, 284, 175

(56) References Cited

U.S. PATENT DOCUMENTS

| | | |
|---|---|---|
| 3,959,546 A | 5/1976 | Hill |
| 4,041,197 A | 8/1977 | Gagne |
| 4,179,541 A | 12/1979 | Miyama et al. |
| 4,370,389 A | 1/1983 | Ogura et al. |
| 4,443,535 A | 4/1984 | Kiritani et al. |
| 4,477,502 A | 10/1984 | O'Sullivan |
| 4,954,297 A | 9/1990 | Beery et al. |
| 4,987,014 A | 1/1991 | Woodward et al. |
| 5,098,497 A | 3/1992 | Brinley |
| 5,160,777 A | 11/1992 | Woodward et al. |
| 5,232,535 A | 8/1993 | Brinley |
| 5,350,476 A | 9/1994 | Edwards |
| 5,393,571 A | 2/1995 | Suga et al. |
| 5,902,770 A * | 5/1999 | Narita et al. ................. 503/227 |

FOREIGN PATENT DOCUMENTS

EP          0-769-588          4/1997

* cited by examiner

*Primary Examiner*—William P. Watkins, III
(74) *Attorney, Agent, or Firm*—Wallenstein Wagner & Rockey, Ltd

(57) ABSTRACT

Structured polyolefin coated substrates and processes for making the same are disclosed. A chill roll is used to impart a plurality of peaks which protrude outwardly from the polyolefin coating of the structured substrate. In addition, the chill roll surface is treated to impart a matte finish and thus to transfer a matte finish to the area surrounding the peaks of the polyolefin coating.

16 Claims, 2 Drawing Sheets

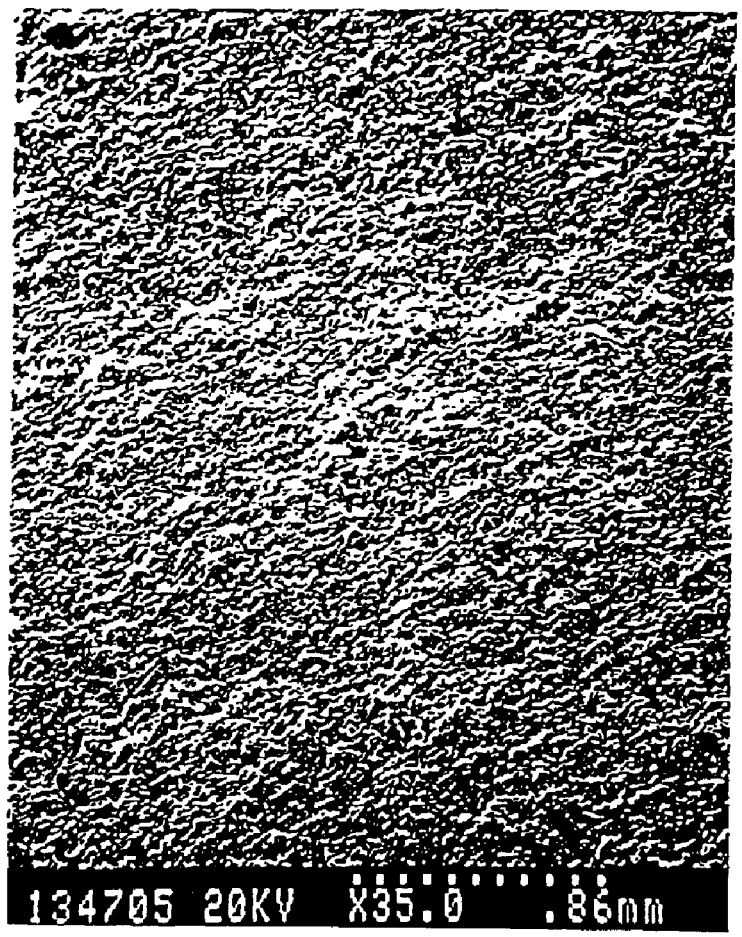
FIGURE 3 SEM photomicrograph of polypropylene-coated EBS paper. 35X magnification.

STRUCTURED POLYOLEFIN COATED SUBSTRATES AND PROCESSES FOR MAKING THE SAME

RELATED APPLICATION

This application is a continuation-in-part of application Ser. No. 09/547,549 filed on Apr. 12, 2000, now abandoned, which is commonly assigned and incorporated by reference herein.

FIELD OF THE INVENTION

This invention relates to sheet materials; and more particularly to polyolefin coated sheet materials and processes for making the same.

BACKGROUND OF TILE INVENTION

Polyolefin coated substrates, such as polyethylene coated paper, are known for a variety of applications. The substrates can be prepared having a variety of surface finishes, such as mirror gloss finishes, satin finishes, matte finishes, and structured finishes with peaks or projections protruding outwardly from the surface.

Polyolefin coated substrates are typically prepared by extruding a molten polyolefin polymer onto the surface of a substrate and directing the resultant coated substrate through the nip of a chill roll and pressure roll. The desired surface appearance is imparted to the polyolefin coating by selection of a chill roll having the appropriate surface characteristics, i.e., a mirror finish to impart a glossy appearance to the polyolefin coating, a pocketed roll to impart peaks to the polyolefin coated surface, and the like.

The various surface finishes can be functional, aesthetic, or both in nature. For example, a glossy surface appearance may be desirable in flexible packaging applications. In some applications, however, a given finish is detrimental to the intended function of the product. For example, polyolefin coated substrates having a glossy appearance typically have a very high coefficient of friction. This can cause handling difficulties. For example, the sheets tend to stick together when feeding a stack of glossy sheets into printing equipment.

To reduce the coefficient of friction of a glossy polyolefin coated substrate, the polymeric surface can be "structured" to impart a plurality of small peaks projecting above the surface of the polyolefin coating. The resultant surface maintains a glossy surface appearance while the creation of numerous peaks on the surface can lower frictional characteristics to improve handling in subsequent operations.

For many end uses, a glossy appearance is undesirable. For example, many end applications require a paper-like surface appearance, resulting from a matte finish of the polyolefin coating. However, substrates having a matte finish can have too low a coefficient of friction, which can result in handling difficulties as well, particularly when directing such products through manufacturing equipment, laser and/or ink jet printers, and the like. For example, while a stack of matte finish polyolefin coated sheets may separate more easily than glossy sheets, the frictional characteristics of the sheets may be so low that the sheets cannot be adequately "gripped" by guide rollers or other feed mechanisms; as result, the sheets can jam equipment.

SUMMARY OF THE INVENTION

The present invention is a polyolefin coated substrate in which the polyolefin coating has been structured to impart desirable physical and surface appearance properties thereto. The polyolefin coating has a matte surface finish, and specifically a $R_a$ (Arithmetic Average) surface finish ranging from about 1.52 μm to about 3.81 μm, preferably from about 1.80 μm to about 3.04 μm, and most preferably from about 2.10 μm to about 2.79 μm. In addition, the polyolefin coating includes a plurality of peaks protruding outwardly from the surface thereof, the peaks having an $R_z$ ranging from about 10 μm to about 30 μm, more preferably from about 13 μm to about 22 μm and most preferably from about 15 μm to about 20 μm.

The polyolefin coated substrate exhibits several desirable yet contradictory properties. The matte finish contributes a paper like appearance to the substrate. However, in contrast to conventional matte finish polyolefin coated substrates, the structured surface imparts desirable surface frictional properties to the substrate, which in turn improves handling of the product, for example, when directing a stack of the sheets through feeding mechanisms associated with laser printers, digital printers, and the like. It has been found that the structured surface of the matte finish polyolefin coating can improve the frictional characteristics and feeding effectiveness of the sheet material. This is surprising in view of the industry practice of structuring glossy finish polyolefin coated substrates to decrease the frictional characteristics thereof.

The polyolefin coated substrates of the invention generally include a polyolefin coating on a surface of a suitable support substrate. Any of the types of polyolefin resins known in the art to be useful for coating a substrate can be used, and preferably is a polyethylene or polypropylene resin. Similarly, the support substrate can be any of the types of materials known in the art, but preferably is a paper substrate. The support substrate may have a polyolefin coating on one or both opposing surfaces thereof. When the support substrate includes a polyolefin coating on each surface, the coating may be formed of the same or different polyolefin material and/or may have the same or different surface characteristics, depending upon the desired properties of the product. In addition, a surface of the structured substrate may be treated so that the surface is receptive to printed indicia, for example, by corona treatment, applying an ink receptive coating, and the like.

The resultant structured polyolefin coated substrates are useful in a variety of applications. For example a release coating can be applied to a surface of the substrate opposite the structured polyolefin coating to provide a release liner. The sheets are also useful in printing applications using high speed laser or ink jet printers because the sheets can be readily fed through high speed printing equipment with minimal jams or misfeeds. In yet another application, the structured polyolefin coated substrates can be combined with another substrate, such as a polyvinylchloride (PVC) film.

The structured polyolefin coated substrates of the invention can be prepared using an extrusion coating process. Specifically, a suitable polyolefin resin is heated and extruded as a molten film or sheet onto a surface of a support substrate. The resultant coated support substrate is then directed through the nip formed by cooperating pressure and chill rolls to set the molten polyolefin coating and adhere it to the support substrate. The chill roll is selected to impart the desired surface characteristics to the polyolefin coating. In this regard a plurality of pockets extend into the chill roll. In addition, the outer surface of the chill roll is treated to impart the desired matte finish. As a result when the molten polyolefin coating on the support substrate is directed against the chill roll surface, the chill roll transfers its surface characteristics to the polyolefin coating, i.e., imparts a plurality of peaks and a surface finish surrounding the peaks having a matte finish. The product can then be directed to a winding roll or immediately directed to additional downstream processing (such as in line application of a release agent, etc.).

BRIEF DESCRIPTION OF THE DRAWINGS

Some of the features and advantages of the invention having been described, others will become apparent from the detailed description which follows and from the accompanying drawings, in which:

FIG. 3 is a photomicrograph at 35× magnification of a structured polypropylene coated paper substrate in accordance with one embodiment of the invention;

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
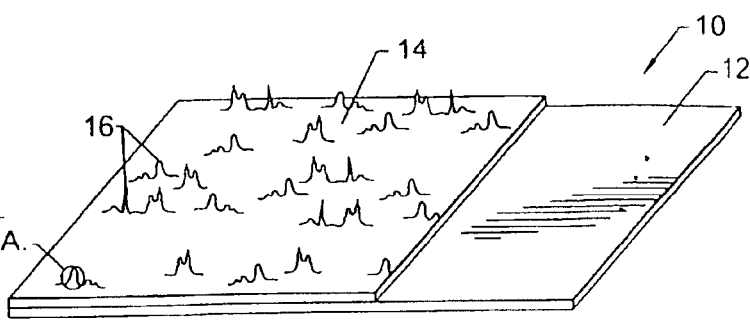
FIG. 1 is a schematic perspective view of a structured polyolefin coated substrate in accordance with the present invention with the respective layers thereof exposed for clarity of illustration.

FIG. 1 is a schematic perspective view of a structured polyolefin coated substrate in accordance with the present invention, designated generally as 10. In FIG. 1, the respective layers of the structured polyolefin coated material 10 are cut away or exposed for clarity of illustration. Generally, structured polyolefin coated substrate 10 includes a support substrate 12 and a polyolefin coating 14 on a surface thereof.

Figure 1A:
FIG. 1A is a greatly enlarged perspective view illustrating a portion of the surface of the structured polyolefin coated substrate of FIG. 1, taken within ring 1A of FIG. 1.
Figure 2:
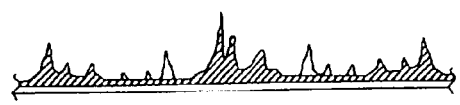
FIG. 2 is a greatly enlarged cross sectional view of the structured polyolefin coated substrate of FIG. 1.

As illustrated in FIG. 1, in the invention, the surface topography of the polyolefin coated substrate 10 is modified to include a plurality of peaks or projections 16 projecting outwardly from the polyolefin coating surface. FIG. 1A is a greatly enlarged perspective view of such a peak or projection 16 taken within ring 1A of FIG. 1. FIG. 2 is a greatly enlarged cross sectional view of the structured polyolefin coated substrate of FIG. 1 and also illustrates peaks 16 projecting upwardly from the outer surface of the polyolefin coating 14. It is noted that the surface topography of polyolefin coating 14 as illustrated in FIGS. 1, 1A, 2 and 4 is greatly enlarged for illustrative purposes and is not to scale.

Peaks 16 can vary in height and generally have an $R_z$ ranging from about 10 μm to about 30 μm, preferably ranging from about 13 μm to about 22 μm, and most preferably ranging from about 15 μm to about 20 μm. As used herein, the average height of the peaks or projections is determined using any of several well known surface profiling devices such as those available from WYKO or Tencor. The height of individual peaks can vary, but preferably the height variations are randomly distributed so that a number of shorter, or higher, peaks are not grouped together.

The opposing surface of the polyolefin coated substrate opposite the polyolefin coating 14 could also include a plurality of peaks projecting outwardly from the opposing surface. For example, both surfaces of the support substrate 12 can be coated with a polyolefin coating, and each of the polyolefin coatings can in turn can be topographically structured or modified. The spacing of peaks 16 can also vary, and preferably the peaks are spaced apart to provide a contact surface of the peaks of about 0.5 to about 8 percent, preferably about 1.5 to about 4 percent, of the total surface area of the polyolefin coating 14 and a matte polyolefin coating surface area between the peaks of about 92 percent or greater of the total polyolefin coating layer.

The outer surface of the polyolefin coating 14 between the peaks 16 is characterized as having a matte finish. As used herein, the term "matte finish" refers to a surface property characterized as having an $R_a$ (Arithmetic Average) surface finish ranging from about 1.52 μm to about 3.81 μm, preferably ranging from about 1.80 pm to about 3.04 μm, and more preferably from about 2.10 μm to about 2.79 μm. The $R_a$ surface finish or roughness of the surface area of the polyolefin coating between the peaks 16 is determined by any of several well known surface profiling devices such as WYKO or Tencor devices. The matte surface topography is not illustrated in the figures by reason of the small scale.

Thus, as illustrated in FIGS. 1, 1A, and 2, the structured polyolefin coatings of the coated substrates of the invention in currently preferred embodiments of the invention include projecting peaks that are typically irregularly shaped and randomly located across the surface of the polyolefin coating. Stated differently, the structured polyolefin surface can be described as having a generally randomized surface topography characterized by a plurality of peaks projecting upwardly therefrom and a matte surface finish between the peaks. As used herein the term "randomly located across the surface of the polyolefin coating" means that the projecting peaks do not necessarily line up in regular arrays of peaks (for example as linear columns and rows of peaks). Also as used herein the term "irregularly shaped" means that the peaks generally do not have a symmetrical cross sectional configuration (such as a conical cross section).

FIG. 3 is a photomicrograph of a polyolefin coated substrate in accordance with one aspect of the invention. Specifically, FIG. 3 illustrates a top plan view of a polypropylene coated paper substrate at 35× magnification. As illustrated therein, the polypropylene surface includes a plurality of peaks and surrounding matte surface area.

Support substrate 12 can be any of the types of substrates as known in the art, including without limitation polymeric substrates, such as polymer films (including metallized and voided films), polymer foams, sheets formed of synthetic staple fibers and/or filaments, and the like; cellulosic substrates, such as paper substrates (including metallized paper); substrates including both polymeric and cellulosic components, for example, sheets formed of a blend or mixture of synthetic and cellulosic staple fibers and/or filaments; metal foils; and the like.

Preferably support substrate 12 is a cellulosic substrate, and more preferably a paper substrate. Any of the types of papers conventionally known in the art for preparing coated papers can be used in the invention, such as but not limited to kraft paper, natural or synthetic pulp paper, paperboard, liner board, and the like. The paper may additionally contain conventional paper adjuvants, such as but not limited to strength increasing agents, sizing agents, dyes, fluorescent whitening agents, preservatives, fillers, antistatic agents, clay, kaolin, talc, barium sulfate, calcium carbonate, zinc oxide, and the like.

The thickness of the paper may range from about 25.4 $\mu$m (1 mils) to about 635 $\mu$m (25 mils), preferably from about 64 $\mu$m (2.5 mils) to about 381 $\mu$m (15 mils), and more preferably about 102 $\mu$m (4 mils) to about 254 $\mu$m (10 mils). The basis weight of the paper sheet generally ranges from about 20 grams per square meter to about 400 grams per square meter, although again as the skilled artisan will appreciate, paper substrates having a basis weight outside of this range can also be used. The paper can be uncoated or coated, machine finished, machine glazed, soft nip calendered, super calendered, bleached, semi bleached, natural, or colored paper as known in the art.

Polyolefin coating 14 can be formed of any of the types of polyolefin resin materials known in the art useful for coating a substrate. Examples of polyolefin resins include ethylene homopolymers, copolymers, and terpolymers, such as high density polyethylene, low density polyethylene, and linear low density polyethylene; propylene homopolymers; polymethylpentene hompolymers; and copolymers, terpolymers, and blends thereof. Examples of copolymerizable monomers include alpha olefins such as styrene, vinyl acetate, acrylic acid, methyl acrylate, ethyl acrylate, acrylamide, methacrylic acid, methyl methacrylate, ethyl methacrylate, methacrylamide, 1-butene, 1-hexene, 1-octene, and diene compounds such as butadiene and isoprene. The polyolefin resin can be employed alone or in combination as in a coextruded coating. The coating weight of the polyolefin coating layer 14 can vary, and typically ranges from about 3.5 grams per square meter to about 47 grams per square meter, preferably from about 16 grams per square meter to about 28 grams per square meter, although coating weights outside of these ranges can also be used. The thickness of the polyolefin coating can vary, typically ranging from about 10 $\mu$m (0.4 mils) to about 51 $\mu$m (2 mils), and preferably from about 18 $\mu$m (0.7 mils) to about 31 $\mu$m (1.2 mils).

The polyolefin may further contain a variety of additives as known in the art, such as but not limited to fluorescent agents, whitening agents, anti oxidizing agents, antistatic agents, releasing agents, dyes, dispersing agents, pigments, fillers and the like. An exception to this list of additives is that the polyolefin should not contain titanium dioxide powder as an additive, as it inhibits the cure of platinum or UV-based silicon systems. Titanium dioxide powder is further undesirable because as an abrasive, it can shorten the screw life of the extruder, and be released from the polyolefin as a dust contaminant.

Figure 4:
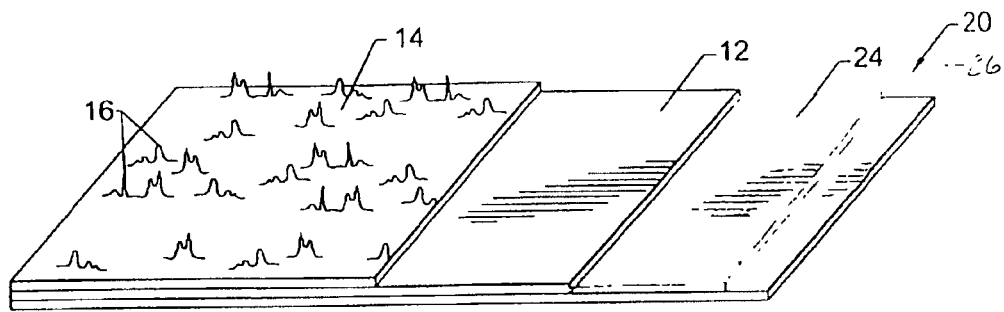
FIG. 4 is a schematic perspective view of a release liner in accordance with the present invention which includes a structured polyolefin coated substrate as a component.

Turning now to FIG. 4, another aspect of the invention is illustrated, specifically, a release liner designated generally as 20. Release liner 20 includes a supporting or carrier substrate, such as the structured polyolefin coated substrate 10 of FIG. 1. Release liner 20 also includes one or more additional and optional polyolefin layers, such as polyolefin layer 24 in FIG. 4 and a release layer 26 on a surface of the substrate opposite the structured polyolefin coating. As noted above, such additional polyolefin coatings, such as layer 24, can be topographically structured or modified, although not required.

Release layer 26 can include any of the types of agents known in the art which impart release properties to a substrate. For example, release layer 26 can be a coating of a release agent, such as a fluoropolymer, silicone, chromium complexes of long chain fatty acids, and the like. Typically, such release agents are cured by any of several techniques, such as by heat, by electromagnetic radiation, such as ultraviolet (UV), electron beam, and the like, by moisture, and the like, as known in the art. Release layer 26 can also be cured by evaporative processes as known in the art, i.e., dried to remove solvent. Exemplary release agents include without limitation SYL OFF® 294 with Dow Corning 176 Catalyst, commercially available from Dow Corning; UV9315 with UV9310C catalyst, commercially available from General Electric Silicones, and Quilon®, commercially available from E. I. DuPont. Corona treatment can advantageously be used to promote adhesion of the release agent to the surface of the structured polyolefin coated substrate. Release layer 26 has a thickness sufficient to impart the desired release properties to the release liner sheet 20 of the invention, and typically ranges from about 0.1 micrometers to about 1.6 micrometers.

The release liners of the invention can be used in combination with other sheet materials as known in the art. For example, adhesive can be applied to the release layer release liner. The adhesive layer/release liner composite structure can thereafter be directed into a face to face relationship with a suitable substrate (which can be any of the types of substrates described above) to form a release liner/adhesive/substrate structure such that the adhesive layer is sandwiched between the substrate and release liner sheet. The adhesive layer can be formed of various suitable conventional adhesives known in the art, and preferably is a pressure sensitive adhesive. Advantageously a surface thereof opposite the adhesive layer is rendered receptive to printed indicia using techniques known in the art, such as corona treatment, application of an additional layer to the substrate surface which is receptive to printed indicia, and the like. Alternatively, the adhesive may be sandwiched between two release liners to form an unsupported adhesive construction.

Although the structured polyolefin coated substrate of the invention has been described above as a useful supporting substrate in a release liner application, the structured polyolefin coated substrates of the invention can be used in other applications as well, and are particularly advantageous in printing applications. In this regard, the surface of the substrate opposite the structured polyolefin coated surface can be rendered receptive to printed indicia as described above. The structured substrate has a paper like surface appearance as a result of the matte finish to the polyolefin coating. However, as discussed above, a matte finish can have frictional characteristics which can cause feeding problems from stacks of sheets or within various types of printers. By imparting a plurality of peaks protruding outwardly from a surface of the polyolefin coating of the substrate, the paper like appearance of the extrusion coated substrate can be maintained while also providing desirable frictional characteristics, for example, for feeding through laser and inkjet printers.

Figure 5:
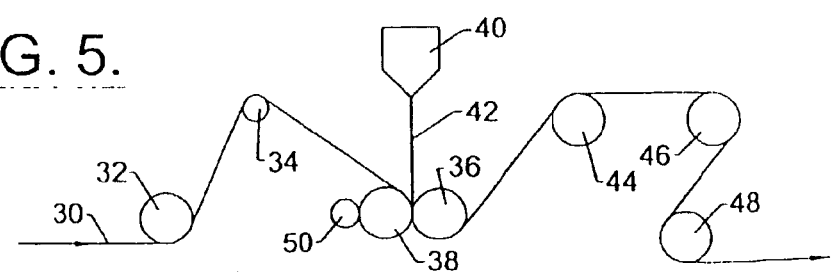
FIG. 5 is a schematic representation of an exemplary process for making the structured polyolefin coated substrates of the invention.

Turning now to FIG. 5, an exemplary process for making the structured polyolefin coated substrates of the invention is schematically represented. As shown in FIG. 5, a web of a suitable substrate, such as a paper substrate 30, is directed from a roll (not shown) and guided by rolls 32 and 34 and to a nip formed by a chill roll 36 and a pressure roll 38. A polyolefin resin is extruded from an extruder 40 in the form of a sheet or film 42 and deposited onto the web 30 of paper. The web of paper 30, having a layer of extrusion coated resin thereon, is directed between the nip formed by chill roll 36 and pressure roll 38. The chill roll 36 can be cooled using conventional techniques, such as for example by passing a cooling medium (e.g., water, through the interior thereof). The temperature of the chill roll 36 is generally maintained from about 55° to about 75° F. The chill roll 36 is typically a cylindrical metal chill roll with a chromium coating applied to the outer surface thereof. The cylindrical roll can be formed of a variety of metals, such as the various steels, aluminum, and the like, as well as alloys thereof. The chromium coating of the invention initially has a rough surface at least on a microscopic scale, i.e., has a porous or microporous surface or an otherwise physically discontinuous surface. Stated differently the chromium plating surface includes peaks of the chromium material surrounded by pockets or cavities. The chromium coating can be applied using appropriate plating techniques and conditions as known in the art to produce such a rough surface with a desired pattern or plurality of pockets extending into the chromium plating. The outer surface of the chromium plating can then be polished to remove peaks projecting upwardly from the surface of the chromium plating. The resultant chromium plated roll includes a plurality of pockets typically have a depth ranging from about 10 to about 30, preferably from about 13 to about 22, and more preferably from about 15 to about 20 $\mu$m. In addition to the pockets, the chill roll also is treated to impart a desired surface roughness to the polished outer cylindrical surface thereof, in this case, to impart a matte finish thereof as defined above. For example, the roll may be gritblasted to produce about a 2.10 $\mu$m to 2.79 $\mu$m $R_a$ matte finish. Alternative techniques can also be used form pockets extending into the roll, for example, laser engraving of a ceramic or metal roll.

As the polyolefin resin is extruded from the extruder 40 onto the paper web 30 and the coated paper passes through the nip formed by rolls 36 and 38, the polyolefin film is adhered to the paper and simultaneously the film surface forms a replica of the chill roll pattern. Specifically, a plurality of peaks projecting outwardly from the polyolefin coating surface corresponding in height to the depth of the pockets of the chill roll is formed. In addition, the surface area of the polyolefin coating surrounding the projecting peaks will have imparted thereto a matte finish corresponding to that of the surface of the chill roll.

The laminating pressure between the pressure roll 38 and the chill roll 36 is adjusted and maintained by contacting a pressure back up roll 50 against the pressure roll 38. The pressure roll 38 is typically a rubber or rubber covered roll having a Shore A. durometer hardness ranging from about 70 to about 95. Other materials having a similar hardness and resiliency as rubber may optionally be used to form the pressure roll 38. The pressure back up roll 50 urges the pressure roll 38 toward the chill roll 36 and may itself be cooled by passing a cooling medium such as water through the interior thereof. The pressure between the pressure roll 38 and chill roll 36 as applied by the pressure back up roll 50 generally ranges from about 14 kN/m to about 140 kN/m, and preferably ranges from about 17.5 kN/m to about 52.5 kN/m.

Contact with the chill roll cools and sets the polyolefin coating and thereafter the polyolefin coated paper is stripped from the chill roll by roll 44 and guided by rolls 46 and 48 to a winder (not shown).

The polyolefin resin is extruded from extruder 40 using conventional conditions. For example, as the skilled artisan will appreciate, the polyolefin resin temperature will vary depending upon the specific resin used but typically ranges from about 260° C. (500° F.) to about 345° C. (650° F.). The resin is extruded at a rate so as to form a polyolefin layer on the paper web 30 having a thickness ranging from about 13 $\mu$m (0.5 mils) to about 51 $\mu$m (2.0 mils). The extrusion rate from extruder 40 is coordinated with the paper web running speed, which typically ranges from about 120 meters per minute up to about 460 meters per minute.

Variations of the extrusion processing conditions will be appreciated by those skilled in the art, such as increasing or decreasing extrusion temperature or web speed, varying the thickness of the polyolefin coating, modification of nip pressure and/or pressure roll hardness, and other process conditions.

The present invention will be further described by the following non-limiting examples.

A roll of bleached kraft with a basis weight of 115 grams per square meter (70 pounds/3000 sq. ft.) is mounted on the unwind of the extrusion coater. The paper is passed through the extrusion coater essentially as shown in the schematic diagram. The line speed is 245 mpm and the web tension is about 0.6 kN/m. In the first extrusion coating operation, low density polyethylene (LDPE) is extruded from the first die at a temperature of 320° C. into the laminating nip where it contacts the paper. The pressure in the nip is 26 kN/m. The hot LDPE is cooled by contacting a chill roll that has the structured surface of the invention. The structured surface is replicated by the LDPE. The coated paper is further conveyed through the machine, turned over using air turning bars and passed through a second extrusion coating laminating nip. LDPE at 320° C. is applied to the uncoated side of the web. The nip pressure is 26 kN/m. The second chill roll is a gloss chill roll, with a surface finish $R_a$ of about 0.05 micrometers that imparts a smooth glossy surface to the LDPE. The paper is then wound up into a roll at the winder.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A structured polyolefin coated substrate comprising a substrate and a titanium dioxide powder-free polyolefin coating with a thickness of between about 11 $\mu$m and 51 $\mu$m on a surface thereof, said polyolefin coating having an $R_a$ surface finish ranging from about 1.52 $\mu$m to about 3.81 $\mu$m and comprising a plurality of irregularly shaped and substantially randomly distributed peaks protruding outwardly therefrom having an $R_z$ ranging from about 10 $\mu$m to about 30 $\mu$m.

2. The substrate of claim 1, wherein said polyolefin coating surface has an $R_z$ surface finish ranging from about 1.80 $\mu$m to about 3.04 $\mu$m.

3. The substrate of claim 2, wherein said polyolefin coating surface has an $R_a$ surface finish ranging from about 2.10 $\mu$m to about 2.79 $\mu$m.

4. The substrate of claim 1, wherein said peaks have an $R_z$ ranging from about 13 $\mu$m to about 22 $\mu$m.

5. The substrate of claim 4, wherein said peaks have an $R_z$ ranging from about 15 µm to about 20 µm.

6. The substrate of claim 1, wherein said peaks comprise about 0.5 to about 8% of the total surface area of said substrate surface.

7. The substrate of claim 1, wherein said substrate is a polyolefin coated paper substrate.

8. The substrate of claim 7, wherein said paper substrate has a thickness ranging from about 25.4 µm (1 mil) to about 635 µm (25 mils) and a basis weight ranging from about 20 grams per square meter to about 400 grams per square meter.

9. The substrate of claim 7, wherein said polyolefin is selected from the group consisting of polyethylene, polypropylene, polymethylpentene, and copolymers, terpolymers and blends thereof.

10. The substrate of claim 1, wherein said polyolefin coating has a coating weight ranging from about 3.5 grams per square meter to about 47 grams per square meter.

11. The substrate of claim 10, wherein said polyolefin coating has a coating weight ranging from about 16 grams per square meter to about 28 grams per square meter.

12. A release liner comprising:
   a structured polyolefin coated substrate comprising a substrate and a titanium dioxide powder-free polyolefin coating with a thickness of between about 11 µm and 51 µm on a surface thereof, said polyolefin coating having an $R_a$ surface finish ranging from about 1.52 µm to about 3.81 µm and comprising a plurality of irregularly shaped and substantially randomly distributed peaks protruding outwardly therefrom having an $R_z$ ranging from about 10 µm to about 30 µm; and a release coating on a surface of said substrate opposite said polyolefin coated surface.

13. A process for making a structured surface substrate, comprising the steps of:
   applying a molten titanium dioxide powder-free polyolefin extrudate onto a surface of a substrate to form a polyolefin coated substrate with a coating thickness of between about 11 µm and 51 µm; and
   directing said polyolefin coated substrate through the nip of cooperating rolls, one of said rolls comprising a plurality of pockets having an average depth ranging from about 10 µm to about 30 µm and an $R_a$ surface finish of about 1.52 µm to about 3.81 µm, under conditions sufficient to impart to a surface of said polyolefin coating a plurality of irregularly shaped and substantially randomly distributed peaks having an average height corresponding to the depth of said pockets and a surface finish corresponding to the $R_a$ surface finish of said roll.

14. The structured polyolefin coated substrate of claim 1 wherein the thickness of the polyolefin coating is in the range of from about 18 µm to about 31 µm.

15. The structured polyolefin coated substrate of claim 12 wherein the thickness of the polyolefin coating is in the range of from about 18 µm to about 31 µm.

16. The process for making the structured polyolefin coated substrate of claim 13 wherein the thickness of the polyolefin coating is in the range of from about 18 µm to about 31 µm.

* * * * *